No. 812,406. PATENTED FEB. 13, 1906.
C. COCHRAN.
CAN OPENER.
APPLICATION FILED JUNE 30, 1905.
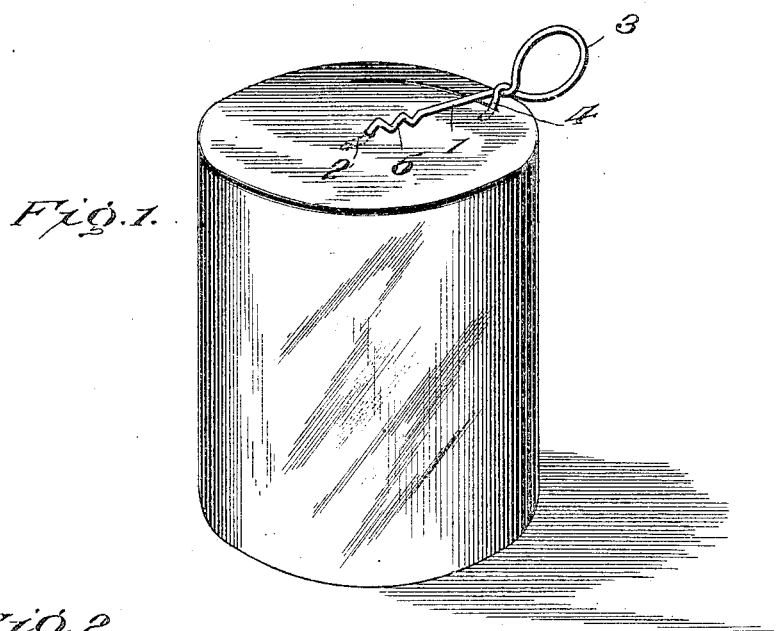
Fig.1.
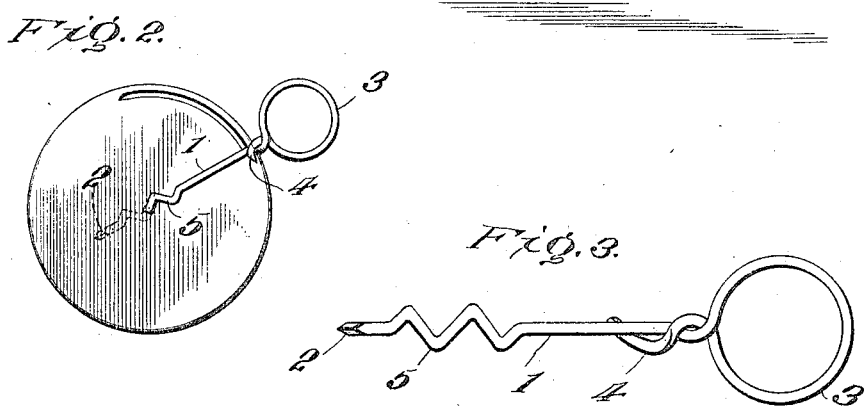
Fig.2.
Fig.3.
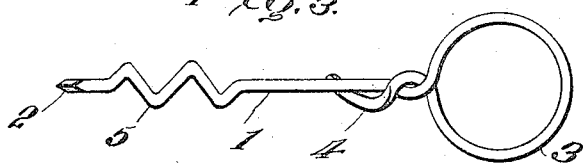
Fig.4.
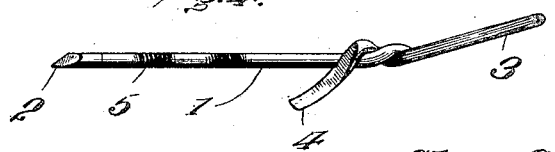
Inventor
Chas. Cochran,
Witnesses
By
Attorneys

UNITED STATES PATENT OFFICE.

CHARLES COCHRAN, OF PLATTSBURG, NEW YORK.

CAN-OPENER.

No. 812,406.　　Specification of Letters Patent.　　Patented Feb. 13, 1906.

Application filed June 30, 1905. Serial No. 267,820.

*To all whom it may concern:*

Be it known that I, CHARLES COCHRAN, a citizen of the United States, residing at Plattsburg, in the county of Clinton and State of New York, have invented certain new and useful Improvements in Can-Openers, of which the following is a specification.

This invention relates to improvements in can-openers, and has for its object to produce a device of this character which is formed out of a single piece of wire and which can be manufactured so cheaply as to enable them to be given away with canned goods.

The invention resides more particularly in the peculiar shaping and positioning of the cutting-blade, whereby the device may be caused to make various-sized openings, according to the size and requirements of the can, and also in the peculiar shape of the shank.

For a full description of the invention and the merits thereof and also to acquire a knowledge of the details of construction of the means for effecting the result reference is to be had to the following description and accompanying drawings, in which—

Figure 1 is a perspective view showing the application of the device in opening a large-sized can. Fig. 2 is a top plan view showing the device as applied in opening a smaller can. Fig. 3 is a top plan view of the can-opener. Fig. 4 is a side elevation of same.

Corresponding and like parts are referred to in the following description and indicated in all the views of the drawings by the same reference characters.

The can-opener comprises a shank portion 1, a puncturing-point 2, and a handle 3, formed by looping the wire upon itself and coiling it upon the shank, the extreme end being bent downward to form a cutting-blade 4. The shank 1 is bent so as to form a series of zigzag portions 5, which are formed, preferably, with comparatively sharp angles between them and lie approximately in the plane of the handle 3. The handle 3 is preferably bent slightly upward in order to enable the operator to handle the implement with greater facility and is formed, as has hitherto been mentioned, by looping the wire and coiling it about the shank 1. The cutting-blade 4 is inclined relative to the shank 1 and is sharpened on one side throughout its entire length. Owing to the fact that the cutting-blade is thus inclined, the implement is enabled to cut openings of various sizes, since by using the point of the cutting-blade a comparatively small opening may be formed, and the deeper the blade is pressed in the larger the opening until a maximum is obtained, when the shank 1 rests against the top of the can.

In order to open a can, the puncturing-point 2 is thrust through the top thereof at approximately its center point and the shank 1 passed through the opening thus formed until the desired zigzag portion thereof is in position within the opening as a pivot. By pressing downwardly upon the handle 3 the cutting-blade 4 can be pressed inward, so as to cut the desired size of opening when the implement is revolved in the usual manner. Should a zigzag portion 5 near the puncturing-point be used, the implement will cut a large opening and can be employed to open a large-sized can, while if a zigzag portion located farther up on the shank be employed a small opening will be made. The angles at each end of the zigzag portion which is used tend to prevent the shank from being accidentally pushed into or pulled out of the can, but permit of ready adjustment when desired. The device can hence be employed with equal facility for opening both small and large sized cans, and owing to the inclination of the cutting-blade 4 a great degree of adjustability is obtained in regard to the size of the opening which is cut. Since the zigzag portions are in the same plane as the handle, they rest against the top of the can and tend to hold the instrument in normal position, so that the cutting-blade can operate with great facility. In the ordinary instrument of this type the operator has to devote a large amount of his energy to prevent the device from wabbling, while with my improved construction the fact that the zigzag portions are in the same plane as the top of the can tends to prevent this, and the operator can devote his entire energy to simply turning the instrument.

It will thus be understood that I have invented a can-opener which is adapted to cut various sizes of openings without any adjustment of the tool itself and which can therefore be employed with equal facility for opening the various sizes of cans.

Having thus described the invention, what is claimed as new is—

1. A can-opener formed out of a single piece of wire and comprising a shank and a handle, said handle being formed by looping the wire upon itself and coiling it about the shank, the ends of the wire being bent downwardly to form a cutting-blade which is sharpened on one side throughout its entire length and is inclined relative to the shank so that various sizes of openings can be cut according to the amount the cutting-blade is pressed into the can, while the shank is formed with a series of zigzag portions which lie approximately in the plane of the handle, the free end of the shank being sharpened so as to provide a puncturing-point.

2. A can-opener formed out of a single piece of wire and comprising a shank one end of which is provided with a puncturing-point while the opposite end is provided with a handle formed by looping the wire upon itself and coiling it about the shank, the ends of the wire being bent downwardly to form a cutting-blade which is sharpened on one side throughout its entire length and inclined to the shank so that various sizes of openings can be cut according to the amount the cutting-blade is pressed into the can.

In testimony whereof I affix my signature in presence of two witnesses.

CHARLES COCHRAN. [L. S.]

Witnesses:
　　JOSHUA B. REYNOLDS,
　　WILLIAM H. McDOWELL.